J. McCANN.
Surveying Instrument.
No. 519.
Patented Dec. 20, 1837.
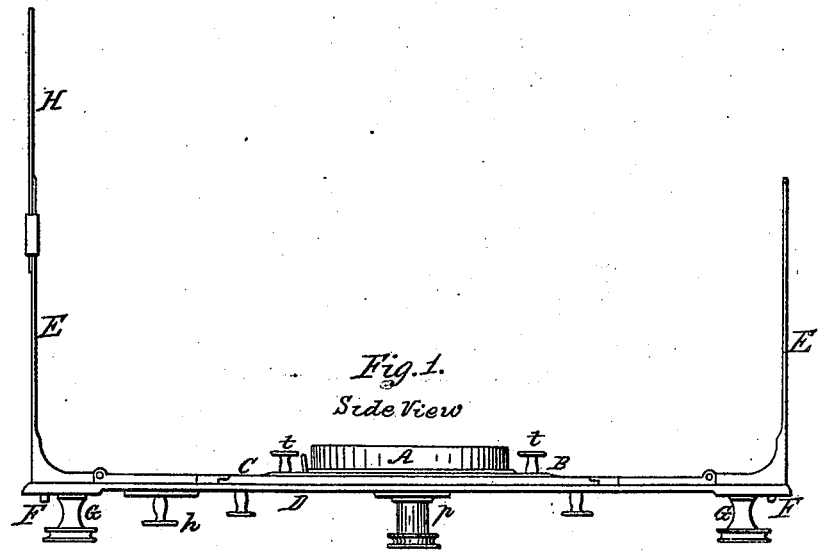
Fig. 1.
Side View
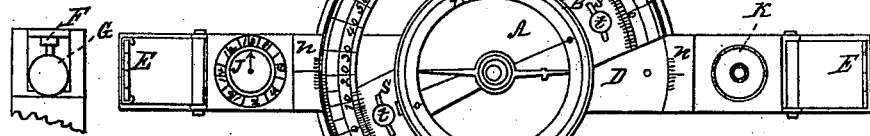
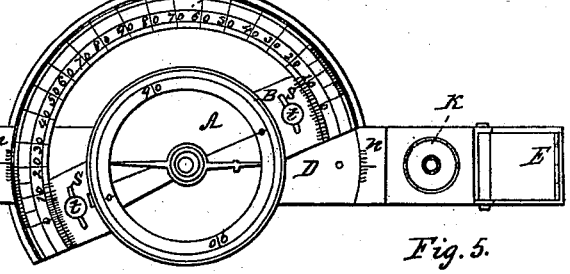
Fig. 7.
Fig. 3.
Fig. 8.
Fig. 5.
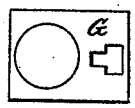
Fig. 4.
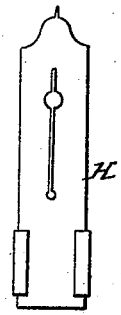
Fig. 6.
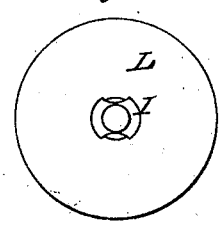

UNITED STATES PATENT OFFICE.

JAMES McCANN, OF NEW MARKET, VIRGINIA.

CIRCUMFERENTER.

Specification of Letters Patent No. 519, dated December 20, 1837.

*To all whom it may concern:*

Be it known that I, JAMES MCCANN, of New Market, in the county of Shenandoah and State of Virginia, have invented a new and useful Improvement in Circumferenters, which is described as follows, reference being had to the annexed drawings of the same, making part of this specification.

A in Figures 1 and 2 represents the compass box and needle made in the usual manner; B, a nonius plate to which the compass box is attached, having a horizontal movement on a graduated semicircle, for changing the meridian line, in allowing for the variation of the needles, being fastened at the required point by the screws $t\ t$ passing into the semi-circle C—the slots S S allowing the nonius plate to move over the screws, $c$, the graduated semi-circle to which the nonius plate and compass box are attached. $s\ s$ are slots, and $t\ t$ screws in the nonius plate to allow of the movement of the compass box and nonius plate on the semi-circle and for securing the same in any required position; D, the bar upon which the semi-circle, nonius plate, and compass box are placed and on which they have a circular horizontal movement. $n$ nonius on the bar. $p$, pin passing through the bar, semi-circle, and nonius plate into the bottom of the compass box and to which this is secured at the upper end—the socket for the ball of the tripod being secured at the lower ends; E E, two sights—one placed at each end of the bar and to which they are attached by joints or hinges, so that they can be turned down in a parallel position with the bar, for the convenience of packing,— being secured in that position by a notched button, turning on the top of the compass cover; F F, necks or hooks at the angles of the sights which pass through mortises in the bar, being grasped and held fast by forked slides on the under side of the bar for securing the sights in a position at right angles to the bar. See also Fig. 4. G G, Figs. 3 and 7, are the forked slides on the under side of the bar; H, Figs. 1 and 8, additional sight, made to slide upon one of the hinged sights for taking observations at great angles of elevation and depression; I, notched button for securing the sights when turnned down, Figs. 5 and 6; J, counter for determining the number of chains measured. $h$, head for turning the same, Fig. 2; K, spirit level for adjusting the instrument in a horizontal position; L, lid of the compass box, Fig. 6.

To use this instrument; first level it and adjust it for the variation of the needle by moving the nonius plate, to which the compass box is attached, east or west, as many degrees as the known variation of the needle, and screw it fast. Then to take an angle, say of 20 degs. move the semi-circle, to which the compass box and nonius plate are attached around until the meridian line of the bar is coincident with the degree marked 20. Then take the sight and enter it in the note book in the usual manner. Should the sight required be at a greater angle of elevation or depression than the hinged sights will admit of being taken, then apply the additional sliding sight and the difficulty will be removed.

The counter is used by turning with the thumb and finger the circular head $h$ of its axle—the pointer indicating on the graduated circle the number of chains.

The invention claimed by me, the said JAMES MCCANN, and which I desire to secure by Letters Patent consists—

1. In the addition to the compass box of the nonius plate for allowing for the variation of the needle and the method of using the same.

2. The slides and hooks for securing the sights in a perpendicular position to the bar.

3. The addition of the sliding sight.

4. The combination of the counter with the circumferenter.

JAMES McCANN.

Witnesses:
FRANCIS TIBORT,
ANDERSON MOOR.